July 13, 1954  P. F. DRAGON  2,683,622
AUTOMATIC FERTILIZER INJECTOR
Filed Sept. 29, 1951
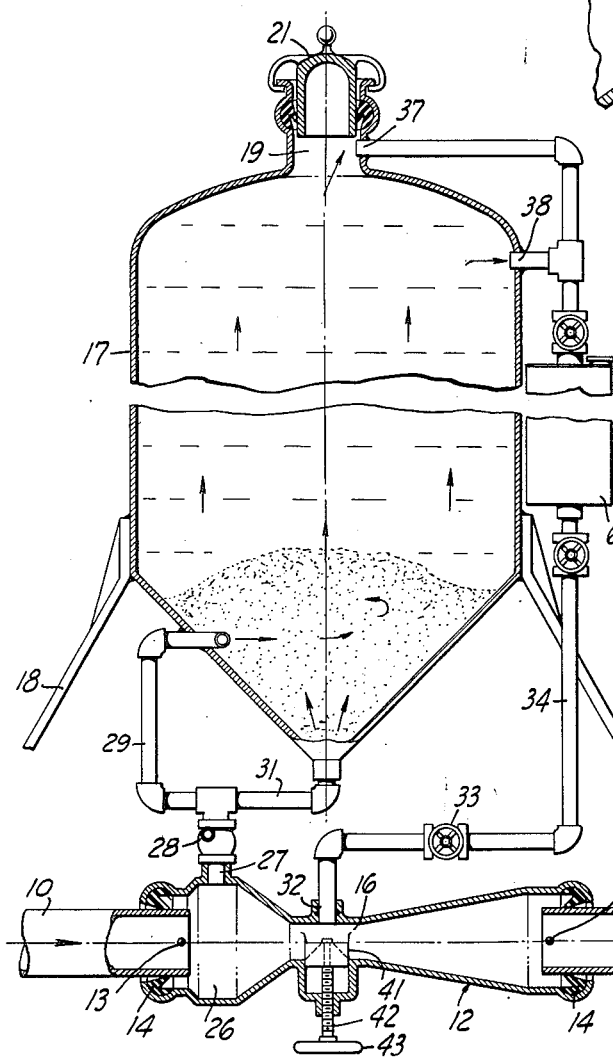
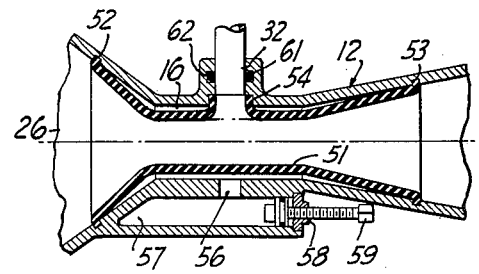
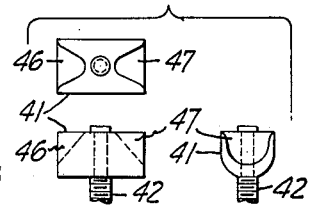
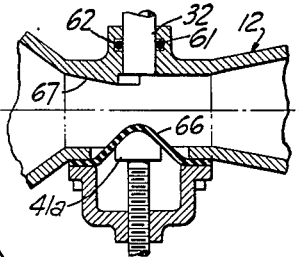
INVENTOR.
Peter F. Dragon
BY
ATTORNEYS Patented July 13, 1954

2,683,622

UNITED STATES PATENT OFFICE 2,683,622

AUTOMATIC FERTILIZER INJECTOR

Peter F. Dragon, Oakland, Calif.

Application September 29, 1951, Serial No. 248,942

7 Claims. (Cl. 299—84)

This invention relates to automatic fertilizer injectors and particularly to devices of this kind which are adapted to be placed in a surface irrigation system of the general type which utilizes a movable surface pipe.

The science of surface irrigation has developed to the point where this type of irrigation, making use of overhead sprinklers, is recognized as being particularly advantageous in connection with the growing of certain crops. It has now been found that the overhead sprinkler system is useful also in connection with the spraying of fertilizer. In other words by applying nutrients to the ground by mixing them with the irrigating water, culture of the plants is enhanced. Many materials which will dissolve in water will not dissolve in the soil moisture when applied dry to the surface of the soil around growing plants. For this reason if materials are first dissolved in water applied to the soil, they will be much more quickly available to growing plants and can be applied as the plants need them. This method eliminates all danger of burning the plants with fertilizer and makes the fertilization of plants much more effective. This type of fertilization has been used on trees, pasture, and vegetable plants with equal success.

It is an object of this invention to provide an automatic fertilizer injector for injecting fertilizer into surface irrigation systems.

It is a further object of this invention to provide a device of this character which dissolves and injects fertilizers of all kinds including gypsum, chemicals, etc.

It is a further object of this invention to provide a device of this kind which operates by the flow of water in the pipe line system.

It is a further object of this invention to provide a device of this character which may be inserted at any convenient location in the pipe line system.

It is a further object of this invention to provide a simple device of this character which does not require the utilization of a pump or other mechanical force injection and eliminates the use of expensive machinery.

Other objects and advantages of this invention will appear from the following specification taken in conjunction with the accompanying drawings, in which:

Figure 1 represents a view, in cross-section, on an automatic fertilizer injector incorporating my invention.

Figure 2 is an enlarged detailed view of the movable block illustrated in Figure 1.

Figure 3 represents a second embodiment of the device illustrated in Figure 1.

Figure 4 represents a modification of the device illustrated in Figures 1 and 3.

As indicated in Figure 1 my device is adapted to be inserted in a pipe line illustrated generally as inflow pipe 10 and outflow pipe 11. A short device 12 is put in the line and is secured thereto by any suitable means as by means of bolts 13 and a water tight connection is obtained by the rubber gaskets 14. In section it will be noted that the device 12 generally is formed in the shape of a venturi with a throat or restricted portion 16.

A fertilizer tank 17 may be supported in any suitable manner as by means of the legs 18. The tank 17 is provided with a suitable orifice 19 which is adapted to be closed by a cap 21, through which fertilizer may be introduced into the tank.

The inflow side of the device 12 is slightly belled as indicated to provide an enlarged zone 26, immediately in advance of the restricted area 16.

In the general area of the belled section 26 I provide an outlet orifice 27 which, through valve 28, permits flow of fluid from within the zone 26 through conduits 29 and 31 to the tank 17 generally as indicated.

The device 12 at the point of the restricted zone 16 is likewise provided with an orifice 32 which, through a valve 33 and conduit 34 is in communication with the interior of the tank 17 through the openings 37 and 38.

Operation of the device may briefly be described as follows. The device is inserted in the pipeline of an overhead sprinkler system and is secured thereto in a leakproof manner. As the irrigation water flows through the body 12 it will pass through both the enlarged zone 26 and the restricted zone 16 into the outflow pipe 11. It will also flow through the orifice 27, and conduits 29 and 31 into the tank 17. The water entering the tank 17 is impinged against the inner side walls of the tank to provide a whirlpool effect and thoroughly mix the water with the fertilizer. Because of the difference in cross-sectional areas of the zones 16 and 26 a differential pressure will result therebetween, having the effect of urging irrigation water into the tank 17 through the conduits 29 and 31. Water containing fertilizer will then be drawn into the device 12 at the area of the restricted zone 16, because of the differential pressures existing in the device 12, the zone 26, the zone 16 and the tank 17. In this manner, fertilizer will be passed on to pipe 11.

Different types of fertilizers, different sizes of pipe, and different pressures and velocities of water through the body 12 may render it desirable to be able to change the differential pressures existing in zones 16 and 26. I have found it desirable, for example, in connection with the utilization of certain types of fertilizer that the pressure differential be in the neighborhood of 6 pounds. In using other fertilizers, however, other pressures may be desirable. In order, therefore to provide means for determining the differential pressure, I have provided means for varying or adjusting the area of the throat 16.

The means for restricting this area consists of a movable block 41 which is movable within slots of the side walls of the device 12 at the area of the restriction 16. The block 41 is movable by the lead screw 42 operated by handle 43.

The block 41 is more particularly illustrated in Figure 2 and it will be seen to have a pair of cut away portions 46 and 47 which are designed to provide a streamline effect regardless of the position of the block within the restricted area 16. It is therefore obvious that by moving the block upwardly and downwardly (as viewed in Figure 1) it is possible to vary the area of the zone 16 without losing the venturi effect of the body 12.

In the embodiment illustrated in Figure 3 I provide a second way of restricting the orifice 16. Immediately adjacent the body 12 I have provided a rubber sleeve 51 which is preferably molded in such a manner that it follows the contour of the body 12. The tubular sleeve 51 is provided with flanges 52 and 53 in order that it may be secured in a leakproof manner to the inner walls of the body 12. It is also secured at point 54 in such a manner that a leakproof seal between the member 51 and the inflow orifice 32 is provided. The stand pipe 32 is loosely mounted within the body 12 for vertical movement with respect thereto. The body 12 is provided with an annular groove 61 which seats an O-ring 62 which provides an airtight seal between the conduit 32 and the body 12. The utilization of the movable pipe 32 permits uniform deflection of the tube 51 to decrease the size of the throat in the venturi. The body 12 is provided with a second orifice 56 which leads to an outside chamber 57 which is otherwise closed except for a threaded orifice 58 which accommodates a long screw member 59 which may be moved into and out of the cavity 57.

The entire chamber 57 is filled with a liquid. By rotating the member 59 it can be caused to move in and out of the cavity 57 thereby urging the fluid within the cavity through the orifice 56 into the area surrounding the tubular member 51. By adjusting the position of the screw member 59 therefore, the quantity of liquid urged through the orifice 56 may be carefully determined. As the liquid goes into that area around tube 51 it will tend to urge the same away from the walls of the device 12 and to restrict not only the orifice in the zone 16 but also to alter symmetrically the inner walls of the Venturi shaped member 12.

By operation of the handle 43 (Figure 1) the cross-sectional area of the orifice 16 may be varied with the result that the pressure differential at zones 26 and 16 may be regulated. The pressure differential existing between the pipe 10 and the tank 17 will thus be varied to determine the rapidity with which the fertilizer will be withdrawn from the tank 17.

As illustrated in Figure 4 I have provided another novel means of increasing or decreasing the size of the Venturi throat. The body 12 is built substantially as illustrated in Figure 1 with the exception however, that a block 41a is positioned beneath a rubber diaphragm 66 which is adapted to be deformed by the block 41a as the same moves upwardly and downwardly. In this manner the throat of the venturi may likewise be restricted by operation of the handle 43. Furthermore it will be noted that I have provided a lip 67 immediately in advance of the inflow pipe 32. The purpose of this lip is to create a slight vacuum at the point of injection of the fluid from the conduit 32. Vacuum at the point of injection further effectively serves to draw fertilizer or fumigant or insecticide from within the tank 17. A small tank 68 may be inserted in the line 34 as indicated in Figure 1 for use when the device is being used for rapid introduction of small quantities of material into the line.

It will be obvious therefore that I have provided a device which is entirely automatic and which dissolves all suitable fertilizers and distributes them to the irrigation system. It is also apparent that no further equipment is necessary by way of pumps etc. and that for this reason the unit may be placed at any position desired and need not be located close to a source of electric power etc.

Utilization of either one of the adjustable Venturi throats illustrated in Figures 1 and 3 renders this a flexible device. Since the throat 16 is readily adjustable the pressure differential within the inlet pipe and the tank 17 may be finely adjusted in the field to determine the quantity of fertilizer or other material, such as insecticides, that can be put upon the plants without hindering the rate of irrigation. It is apparent that the quantity exhausted from the tank depends upon the pressure differential.

I claim:

1. In a fertilizer injection system of the closed circuit type utilizing differential pressure for introducing fertilizer into a line, a liquid carrying line, a Venturi section in said line and a storage tank adapted to contain a quantity of powdered material, means for introducing liquid from said line to said storage tank comprising a conduit leading from the inflow side of said Venturi section to the bottom of said storage tank, means for introducing mixed material from said tank to said line comprising a conduit from the top of said tank to the throat of said Venturi section and means for gradually varying the differential pressure comprising a barrier adapted to be moved toward or away from one wall of the throat of said venturi to gradually increase or decrease the size of said Venturi throat.

2. In an injection system of the closed circuit type utilizing differential pressure for introducing mixed fertilizer or insecticide in a liquid carrying line, a liquid carrying line, a Venturi section in said line, a tank adapted to contain a quantity of powdered material adapted to be mixed with water, a conduit from the inflow side of said venturi to said tank entering said storage tank tangentially and near the bottom thereof, a conduit from the top of said storage tank to the throat of said Venturi section, means for providing variable differential pressures comprising an adjustable Venturi throat, said means consisting of a barrier adapted to be moved toward or away from one wall of the throat of said Venturi to gradually increase or decrease the size of said Venturi throat.

3. In a fertilizer injection system of the closed circuit type utilizing differential pressure for introducing mixed fertilizer or insecticide in a liquid carrying line, a Venturi section in said line, one wall of the throat of said venturi comprising a deformable member and means for gradually deforming said member to a series of positions laterally across the throat of said venturi.

4. In a fertilizer injection system of the closed circuit type utilizing differential pressure for introducing mixed fertilizer or insecticide in a liquid carrying line, a Venturi section in said line, the throat of said venturi being lined with a readily deformable liner and means for deforming said liner to gradually vary the cross sectional area of said throat.

5. In an injection system of the closed circuit type utilizing differential pressure for introducing mixed fertilizer or insecticide into a liquid carrying line, a liquid carrying line, a body having a Venturi-shaped flow passage therethrough forming inlet, throat and outlet portions in said body, said inlet and outlet portions being connected to said line, a tank adapted to contain a quantity of the fertilizer or insecticide, a conduit from the inlet side of said body to said tank entering said tank tangentially and near the bottom thereof, a second conduit from the inlet side of said body to said tank entering said tank vertically at the bottom thereof, a conduit from the top of said tank to the throat of said body, means for providing a variation of differential pressures between the inlet and the throat of said body comprising means for gradually increasing or decreasing the size of the throat in said body.

6. In an injection system of the closed circuit type utilizing differential pressure for introducing mixed fertilizer or insecticide into a liquid carrying line, a liquid carrying line, a body having a Venturi-shaped flow passage therethrough forming inlet, throat, and outlet portions in said body, said inlet and outlet portions being connected to said line, a tank adapted to contain a quantity of powdered material adapted to be mixed with water, a conduit from the inlet side of said venturi to said tank entering said tank tangentially and near the bottom thereof, a second conduit from the inlet side of said body to said tank entering said tank vertically at the bottom thereof, a conduit from the top of said tank to the throat of said body, means in the throat of said body for gradually increasing or decreasing the size of the throat.

7. In a fertilizer injection system of the closed circuit type utilizing differential pressure for introducing fertilizer into the line, a liquid carrying line, a body having a Venturi-shaped passage therethrough forming inlet, throat, and outlet portions in said body, said inlet portion being connected to the inlet side of said liquid carrying line and said outlet portion being connected to the discharge side of said liquid carrying line, a tank adapted to contain a quantity of fertilizer, means for introducing liquid from said inlet portion to the storage tank, means for introducing mixed fertilizer from said tank to said line at the throat of said body, means for gradually decreasing or increasing the size of said throat, said means comprising a recess in the vicinity of said throat, a movable block mounted in said recess, a lead screw mounted in said recess and attached to said block, a handle attached to said lead screw for gradually increasing or decreasing the size of the Venturi throat by gradually moving said block inwardly or outwardly.

References Cited in the file of this patent

UNITED STATES PATENTS

| Number | Name | Date |
|---|---|---|
| 2,507,410 | Kemp | May 9, 1950 |
| 2,509,122 | Wolfson | May 23, 1950 |
| 2,536,361 | Flanden | June 2, 1951 |
| 2,571,871 | Hayes | Oct. 16, 1951 |
| 2,592,884 | Fox | Apr. 15, 1952 |
| 2,599,678 | Walker | June 10, 1952 |